United States Patent
Jefferies

(12) 
(10) Patent No.: US 11,287,049 B1
(45) Date of Patent: Mar. 29, 2022

(54) UNIBODY COMPONENTS FOR HIGH-PRESSURE VALVES

(71) Applicant: IMS Machine, LLC, Granbury, TX (US)

(72) Inventor: James Allen Jefferies, Granbury, TX (US)

(73) Assignee: IMS Machine, LLC, Granbury, TX (US)

( * ) Notice: Subject to any disclaimer, the term of this patent is extended or adjusted under 35 U.S.C. 154(b) by 48 days.

(21) Appl. No.: 16/740,970

(22) Filed: Jan. 13, 2020

(51) Int. Cl.
*F16K 27/00* (2006.01)
*B23P 15/00* (2006.01)

(52) U.S. Cl.
CPC ............ *F16K 27/00* (2013.01); *B23P 15/001* (2013.01)

(58) Field of Classification Search
CPC ........... F16K 27/00; F16K 1/04; B23P 15/001
See application file for complete search history.

(56) References Cited

U.S. PATENT DOCUMENTS

| 4,558,716 A | * | 12/1985 | Muchow | F16K 1/38 137/269 |
| 4,754,950 A | * | 7/1988 | Tada | C22C 19/052 251/368 |
| 5,762,089 A | * | 6/1998 | Haeberle | F16K 3/0263 251/326 |
| 10,830,359 B2 | * | 11/2020 | Miller | F16K 1/385 |
| 2007/0163655 A1 | * | 7/2007 | Hunter | F16K 3/0236 137/375 |

* cited by examiner

*Primary Examiner* — Michael R Reid
(74) *Attorney, Agent, or Firm* — James E. Walton

(57) ABSTRACT

A high-pressure valve assembly includes a valve body, a unibody choke valve stem, and a unibody choke valve seat having surface hardened wear surfaces formed thereon. The wear surfaces formed are interacting wear surfaces, as with tribological applications. The wear surfaces are hardened using a boronization process or a thermal spray application process. The boronization process is performed using discrete parameters to obtain one of a minimum depth of deposited boronization elements and a desired measured surface hardness value.

6 Claims, 5 Drawing Sheets

UNIBODY COMPONENTS FOR HIGH-PRESSURE VALVES

BACKGROUND

1. Field of the Invention

The present application relates to surface hardening processes and surface hardened apparatuses. In particular, the present application relates to high-pressure valves and valve components produced using a boronizing surface hardening process.

2. Description of Related Art

Currently, high-pressure valves, such as those used in fracking and other mineral extraction processes, incorporate a surface hardening process involving carbides. For example, these valves often include a choke, including a body, internal valve chamber, and a valve stem with a carbide brazed tip. Mineral extraction, such as natural gas production through fracking, involves injections and back flow of fluids and slurries containing sands, bits of rock, debris, and chemicals. Continued use of choke valves over time in such extreme conditions, results wearing, chipping, and cracking of choke valve components, such as the carbide brazed tip.

Currently valve stems are modular, including a removable valve stem tip. Choke valve seats are also modular, including a removable insert that interfaces with the valve stem tip. The removable tip and/or the removable seat insert are replaced when valve failures occur, or when different volumetric flow rates are desired.

Well bore seals and other locations of high-pressure choke valves often incorporate a multi-valve system using a manifold and multiple valves distributed across the manifold. Although such systems can enable continuous use despite the failure of a single valve at the manifold, replacing a failed valve is expensive and time consuming. Additionally, a failure at a valve, such as a broken valve stem tip, can pose safety hazards due to the high pressures of fluids and gases being used, extracted, or contained by the valve. Other chemical and tribological applications, such as gear meshing, moveable engine parts, bearing assemblies, reactors, and similar applications, rely on components with increased surface hardness. Often it is desirable that these component parts maintain at least some degree of ductility. Unfortunately, current surface hardening processes provide few if any options for increasing the surface hardness of valve components and component parts from tribological, chemical, electromechanical, or corrosive applications. If surface hardening processes are improved, often the improvements result an increasingly brittle surface of the component.

Although the aforementioned methods of surface hardening represent great strides in the area of high-pressure valves and similar applications, many shortcomings remain.

DESCRIPTION OF THE DRAWINGS

The novel features believed characteristic of the invention are set forth in the appended claims. However, the invention itself, as well as a preferred mode of use, and further objectives and advantages thereof, will best be understood by reference to the following detailed description when read in conjunction with the accompanying drawings, wherein:

DETAILED DESCRIPTION OF THE PREFERRED EMBODIMENT

Figure 1:
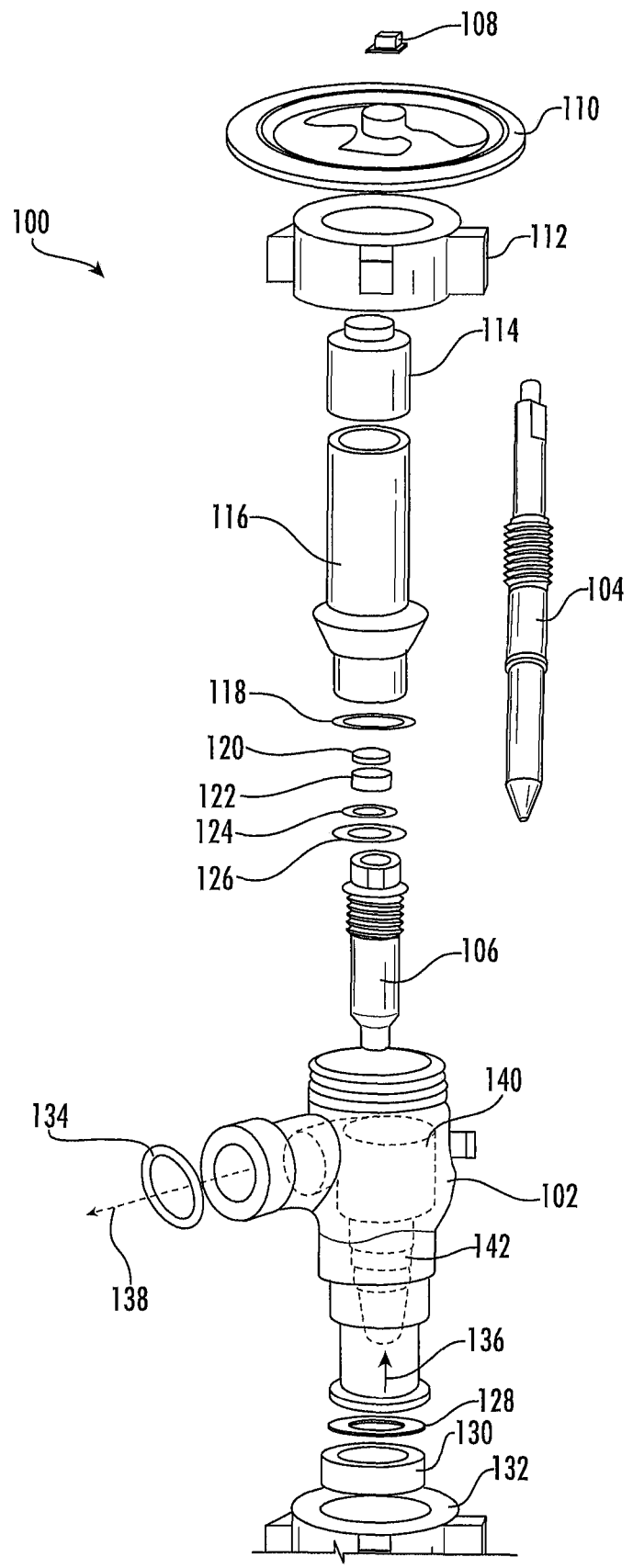
FIG. 1 is a perspective view of a high-pressure valve assembly.

Referring to FIG. 1 in the drawings, a high-pressure valve assembly 100 is illustrated. Valve assembly 100 includes a valve body 102, a valve stem 104, and a valve stem seat 106. In a preferred embodiment, at least the valve stem 104 and the valve stem seat 106 are unibody components, formed from a metal alloy as a unitary or single-bodied component.

In a preferred embodiment, valve assembly 100 includes additional assembly sealing and packing components. For example, valve assembly 100 further includes washer and stem nut 108, handwheel 110, wing nut 112, indicator and set screw 114, bonnet 116, O-ring 118, back-up ring or stem guide 120, packing ring 122, retainer ring 124, seat seal 126, external retaining ring 128, split ring set 130, wing nut 132, and union seal 134. It is noted that the additional assembly sealing and packing components are not limited to those provided above. For example, the additional assembly sealing and packing components may further include a bonnet cap, a drive bushing, a bonnet housing, a grease fitting, a nylon ball, a thumb screw, a packing retainer ring, a union seal, and a choke saver assembled according to desired sealing, packing, or pressurizing parameters known to those skilled in the art.

It is noted that the valve body 102 facilitates flow of a fluid through a first flow path 136 generally flowing through the external retaining ring 128, split ring set 130, and wing nut 132, and a second flow path 138 generally flowing through the union seal 134. In a preferred embodiment, the first flow path 136 is an inlet, and the second flow path 138 is an outlet associated with the valve assembly 100. In another embodiment, the roles are reversed, meaning that the first flow path 136 is an outlet and the second flow path 138 is an inlet. The valve body 102 further includes a valve chamber 140 disposed between the inlet and the outlet having a threaded portion 142 to receive at least a portion of the choke valve seat 106 and the choke valve stem 104 in order to reduce or stop flow of the fluid along the second flow path.

Figure 2A:
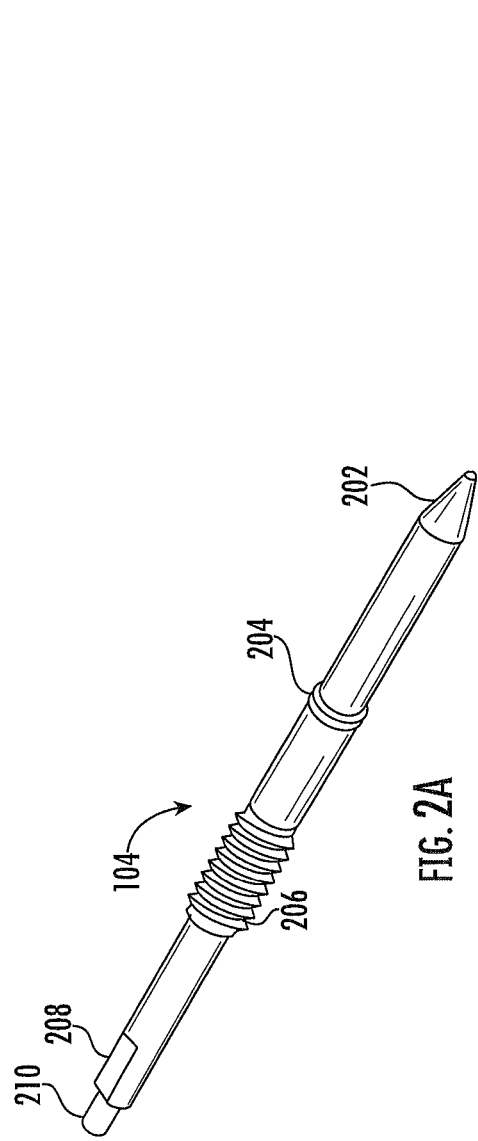
FIG. 2A is a perspective view of a choke valve stem.

Referring now also to FIG. 2A in the drawings, in a preferred embodiment the choke valve stem 104 includes a surface hardened tip 202, a collar 204, an adjustment thread 206, a turn surface 208, and a securing thread 210. In another embodiment, the collar 204, or at least an interfacing surface of the collar 204, is a surface hardened component. In another embodiment, the entire choke valve stem 104 is a surface hardened component.

In a preferred embodiment, the surface hardened components have undergone a boriting process to create a wear surface on the component. Details of the boriting process are discussed below. Generally, the boriting process includes boronizing under specific conditions to form the wear surface and to obtain a minimum surface hardness and a minimum depth of bornization elements. The specific conditions can vary, but typically include heating a surface that is exposed to the boronization elements to approximately 1575° F. to 1775° F. for six, seven, eight, or more hours. In other embodiments, the surface hardened components have undergone a thermal spray coating process, such as high velocity oxygen fuel (HVOF) coating, plasma spray coating, wire arc spray coating, carbide spray coating (e.g., tungsten carbide cobalt (WCCo), chrome carbide nickel chrome ($Cr_3C_2NiCr$), tungsten carbide chrome (WCoCr)), metal coating (e.g., cobalt molybdenum chromium (CoMOCr), iron chrome molybdenum (FeCrMo), nickel aluminum (NiAl), copper (Cu), or aluminum oxide ($Al_2O_3$)), or a combination thereof.

In embodiments where changing volumetric flow rate is desired, a valve stem having a different collar diameter replaces valve stem 104. For example, a replacement unitary choke valve stem having a second diameter that coincides with a second diameter of a replacement unibody choke valve seat may be used to adjust the volumetric flow rate through the valve body 102. Other dimensions or parts of the valve body 102, choke valve stem 104, or choke valve seat 106 may also change to accommodate changing volumetric flow rates, such as the diameter of the surface hardened tip 202, a diameter of the body of the stem, or an inner diameter of a flow path of the valve body. Different diameter choke stems include at least a first one-inch choke stem and a second two-inch choke stem, each respectively being seated within correspondingly similar diameter choke valve seats (e.g., one-inch choke stem seats within a choke valve seat having a maximum orifice inner diameter of one inch).

Figure 2B:
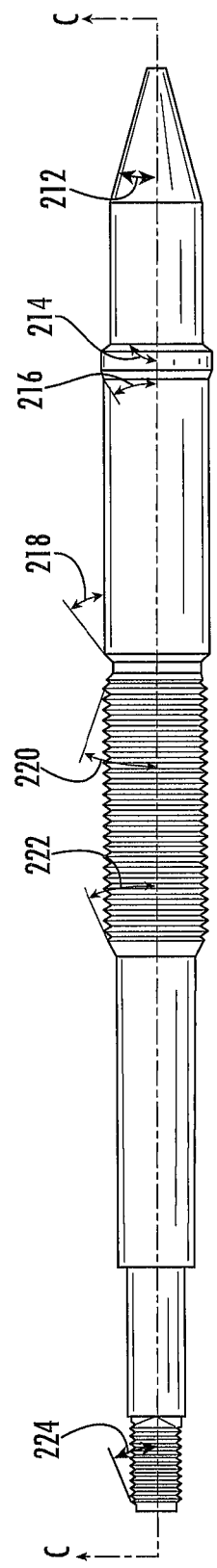
FIG. 2B is a side view of a choke valve stem.

Referring now also to FIG. 2B in the drawings, in a preferred embodiment the choke valve stem 104 includes multiple angles and dimensions for interfacing with other valve components. For example, surface hardened tip 202 includes angle 212, which is configured to interface with an angle of the valve seat in order to form a seal between the surface hardened tip 202 and the valve seat 106. By way of another example, choke valve stem 104 includes angle 214, angle 216, angle 218, angle 220, angle 222, and angle 224, each of which are selectively formed to interface with a specific valve component. For instance, angle 214 is configured to interface with an angle of a head of the choke valve seat 106. The angle 216 is configured to interface with an angle of the back-up ring or stem guide 120. The angle 218 is configured to interface with an angle of the packing ring 122. The angles 220 and 222 are configured to interface with the bonnet 116, and specifically with a thread portion formed within the bonnet 116. Angle 224 is configured to interface with the threading of the stem nut 108.

Figure 2C:
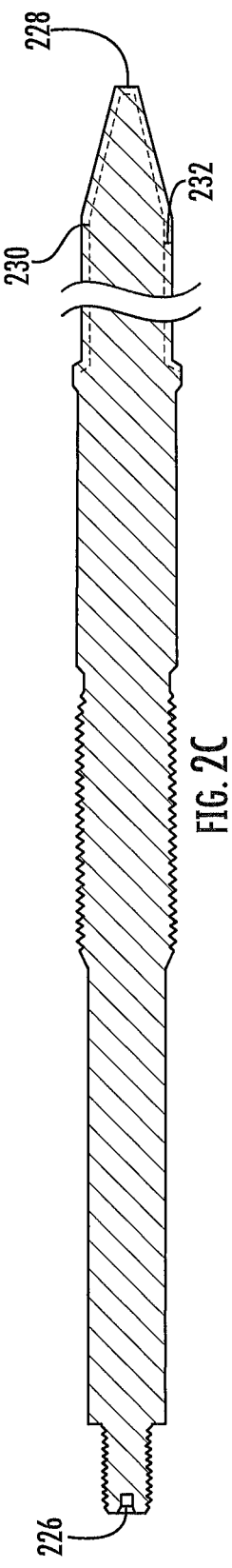
FIG. 2C is a section view of a choke valve stem taken along Section Line C.

Referring now also to FIG. 2C in the drawings, the choke valve stem 104 is depicted as a unibody valve component. The unibody choke valve stem 104 further includes the surface hardened tip 202 having a dimension 228 formed relative to the choke valve seat 106. For example, the dimension 228 must be narrow enough to fit within an opening in the choke valve seat 106 to create a seal, but it is also wide enough to prevent chipping, cracking, or breaking of the tip. In a preferred embodiment, the dimension 228 is a diameter, and a ratio of the diameter of dimension 228 to a diameter of the body of the valve stem ranges from 1/5 to 1/3.

In a preferred embodiment, the unibody choke valve stem 104 further includes the surface hardened tip 202 having a wear surface 230. The wear surface 230 includes boronization elements at a minimum depth 232. In other embodiments, the wear surface 230 includes thermal spray elements, such as carbide. The size of the minimum depth 232 varies depending on the tribological application, however, the depth is at a minimum of 10 micrometers, but also includes minimum depths of 15, 20, 25, and 30 micrometers. Preferably, the minimum depth is between 20 and 30 micrometers.

It is noted that the introduction of boronization elements in metal alloys containing iron result one or more iron boride layers. For example, depending on the boronization time and temperature, a layer with both FeB and $Fe_2B$ is formed. By way of another example, a single phase layer of $Fe_2B$ having approximately 8-10 wt % boron may be formed. In embodiments with layers formed having both FeB and $Fe_2B$, boronization time and temperature are adjusted to maintain a higher concentration of $Fe_2B$ within the layer.

Figure 3A:
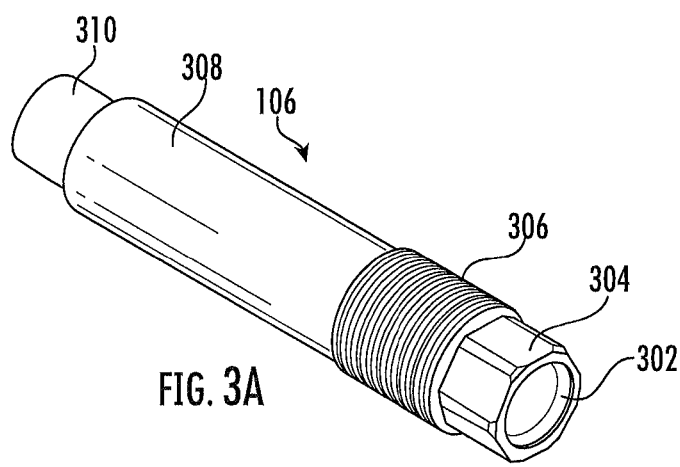
FIG. 3A is a perspective view of a choke valve seat.

Referring now also to FIG. 3A in the drawings, in a preferred embodiment the choke valve seat 106 includes a boronized, surface hardened stem-interfacing opening 302, a surface hardened tool-interfacing head 304, a surface hardened thread 306, a choke seat body 308, and an insert end 310. In another embodiment, only the thread 306 and opening 302 are surface hardened using the boriting process. In another embodiment, the entire choke valve seat 106 is a surface hardened component using the boriting process. In another embodiment, the surface hardening of the choke valve seat 106 and/or its component parts is due to thermal spray coating.

Figure 3B:
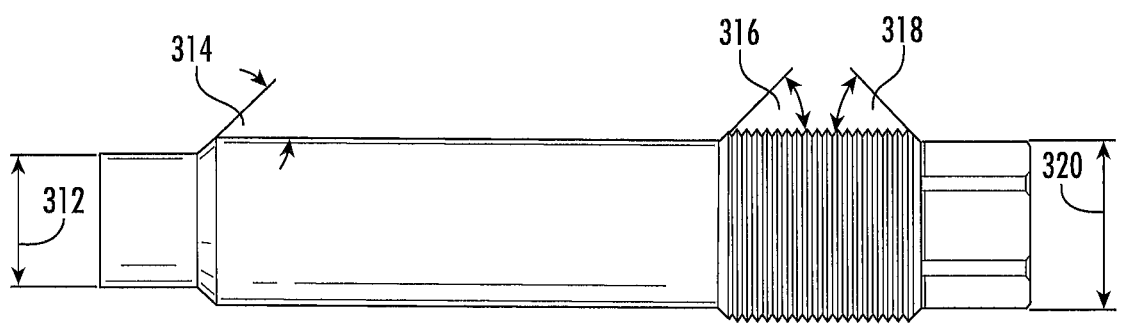
FIG. 3B is a side view of a choke valve seat.

Referring now also to FIG. 3B in the drawings, in a preferred embodiment the choke valve seat 106 includes multiple angles and dimensions for interfacing with other valve components. For example, the insert end 310 includes a dimension 312, which is configured to interface with an opening in the valve body 102. By way of another example, choke valve seat 106 includes angle 314, angle 316, angle 318, and dimension 320, each of which are selectively formed to interface with a specific valve component or valve tool. For instance, angle 314 is configured to interface with an angle of an opening in the valve body 102. The angles 316 and 318 are configured to interface with an angle of a threaded portion in the valve body 102. The dimension 320 is configured to interface with a dimension of a valve tool, such as a choke bean wrench.

Figure 3C:
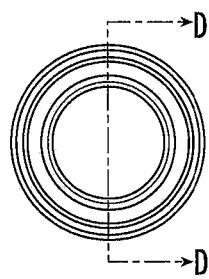
FIG. 3C is a top view of a choke valve seat.

Referring now also to FIG. 3C, the tool-interfacing head 304 is illustrated. Tool-interfacing head 304 is depicted as being formed to interface with a hex wrench, however, this depiction is not meant to be limiting. For example, the tool-interfacing head may be formed to interface with a 3-point, 4-point, or 10-point tool.

Figure 3D:
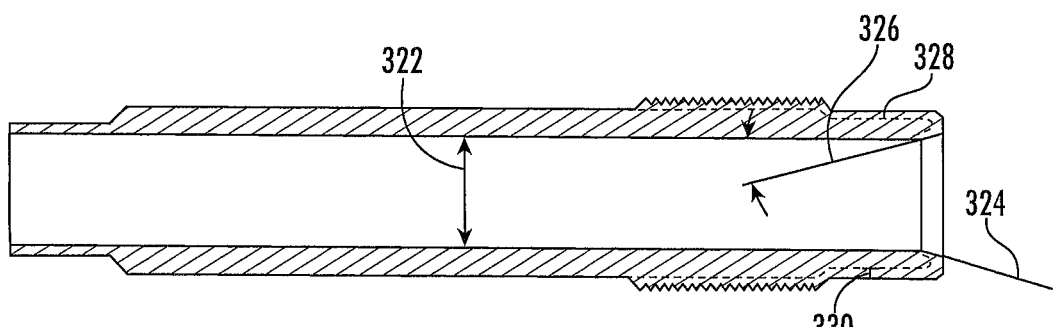
FIG. 3D is a section view of a choke valve seat taken along Section Line D.

Referring now also to FIG. 3D, the choke valve seat 106 is depicted as a unibody valve component. The choke valve seat 106 further includes an inner flow path 322 having a flow dimension, which can be tooled to a specific dimension to obtain a desired volumetric flow rate. The choke valve seat 106 further includes a seat opening having an angle 324 created by the seat opening having an opening dimension that is greater than the flow dimension. Preferably a ratio of the flow dimension to the opening dimension is approximately 9/10, however, this may vary depending on the angle 212 of the surface hardened tip 202 of the choke valve stem 104.

In a preferred embodiment, the unibody choke valve seat 106 further includes the surface hardened stem-interfacing opening 302, the surface hardened tool-interfacing head 304, and the surface hardened thread 306 having a wear surface 328. The wear surface 328 includes boronization elements at a minimum depth 330. In other embodiments, the wear surface 328 includes thermal spray elements like carbide at the minimum depth 330. The size of the minimum depth 330 varies depending on the tribological application, however, the depth is at a minimum of 10 micrometers, but also includes minimum depths of 15, 20, 25, and 30 micrometers. Preferably, the minimum depth is between 20 and 30 micrometers.

Figure 4:
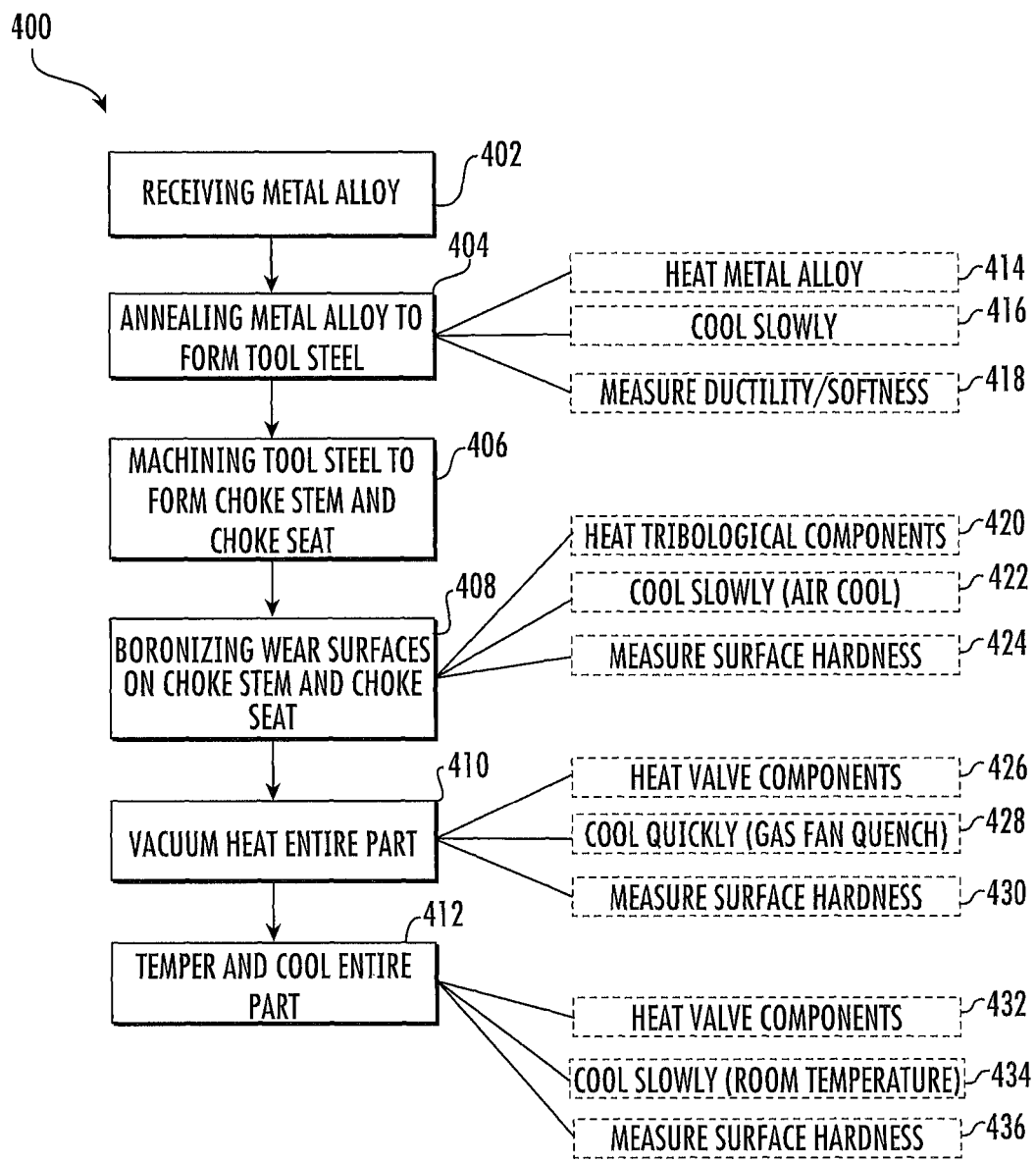
FIG. 4 a flow chart of a method for surface hardening components used in tribological or chemical applications.

Referring now also to FIG. 4 in the drawings, method 400 for hardening a surface of a high-pressure valve component is illustrated. It is noted that although surface hardening for high-pressure valve components is depicted, other forms and processes of surface hardening for chemical, electromechanical, tribological, and corrosive applications are encompassed by the features of the present application, including but not limited to, surface hardening of surfaces for gear meshing, bearings, bearing housings, reactors including a tokamak, and other similar applications.

Step 402 includes providing or receiving a metal alloy to be used in the surface hardening process. In a preferred embodiment, the metal alloy includes a American Society for Testing and Materials (ASTM) A681 or Decarb Free (DCF) D2 steel. In an alternative embodiment, the metal alloy includes an SAE type 630 stainless steel, or a 17-4 steel. The DCF D2 steel comprises 1.53 wt % carbon, 0.280 wt % manganese, 0.020 wt % phosphorus, 0.005 wt % sulphur, 0.250 wt % silicon, 0.200 wt % nickel, 11.400 wt % chromium, 0.770 wt % molybdenum, 0.070 wt % copper, and 0.780 wt % vanadium. The 17-4 steel comprises 15-17.5 wt % chromium, 3-5 wt % nickel, and 3-5 wt % copper, and is useful in high $H_2S$ environments. Other similar metal alloys are encompassed by the features of the present application.

Step 404 includes annealing the metal alloy to form a tool steel. The tool steel is soft enough, or exhibits sufficient ductility, to machine valve components from the tool steel.

Step 406 includes machining the tool steel to form the valve components. For example, a unibody valve choke stem and a unibody valve choke seat are machined from the tool steel.

Step 408 includes surface hardening one or more wear surfaces on the valve components. For example, a special boriting process occurs to form wear surface 230 on the tip of the valve stem. By way of another example, the boronizing occurs to form wear surface 328 on the head of the choke valve seat. By way of another example, a thermal spray coating process, such as with a thermal carbide spray application, may occur to form wear surface 230 and/or 328.

Step 410 includes heating the entire valve component in a vacuum at a high temperature. For example, the entire part is heated in the vacuum at a temperature from 1700° F. to 2000° F. for approximately 1.5 to 2.5 hours. Preferably, the temperature of the vacuum heating is from 1800° F. to 1900° F.

Step 412 includes heating the entire valve component in a tempering process at a relative low temperature. For example, the tempering process includes heating the entire part at a temperature of approximately 300° F. to 375° F. for approximately 1.5 to 2.5 hours.

In a preferred embodiment, method 400 includes one or more additional steps. For example, the annealing step 404 includes heating a metal alloy at step 414. Step 414 includes heating the metal alloy to a temperature ranging from 500° F. to 1,400° F., depending on the chemical composition of the metal alloy.

Step 404 further includes slowly cooling the metal alloy at step 416. For example, the metal alloy may be allowed to cool to ambient or room temperature through air or other circulated cooling means.

Step 404 further includes measuring the ductility or softness of the tool steel that is formed from the annealing at step 418. If the ductility is sufficient to machine valve components, such as a unibody choke valve stem or a unibody choke valve seat, then the process continues. If the desired ductility has not been obtained, additional heating, cooling, and/or chemical composition additives may be needed.

Step 408 further includes step 420. Step 420 includes heating the tribological parts of the valve components machined in step 406. In a preferred embodiment, the heating is for a boriting process that takes place within a sealed box or container that contains, houses, or facilitates introduction of boronization elements. In another embodiment, the heating is for a boronization process that includes sputtering. The sputtering includes using a low current phase (0.5 Amps for 2-4 seconds), a high current phase (5 Amps for 1-2 seconds), and injection within a vacuum, such as a coaxial vacuum, using one or more 135 to 315 degree electrodes (900V). In other embodiments, the heating is for a HVOF coating process with a metal coating. In another embodiment, deposition of $B_2H_6$ in a Helium mixture takes place using glow discharge parameters of 3-4 microAmps/cm for current density and 0.3-0.5 Pa for pressure. In embodiments using boriting, the boronization elements making up the wear surfaces 238, 320 depend on the boronization process used. In a preferred embodiment, the boronizaton process includes a solid pack boriting process, however, plasma glow pulsing, liquid, gaseous state, and ion implantation processes may also be used.

Preferably, the solid pack process includes inserting the portion of the valve component that requires surface hardening into the sealed container. For example, a tip of the choke valve stem may be inserted into the sealed container to boronize the tip, or a first interacting surface. By way of another example, the head of the choke valve stem may be inserted and sealed within the container to heat and boronize the head and the opening (second interacting surface) of the choke valve seat. In another embodiment, the entire choke valve stem or the entire choke valve seat is sealed in the container to undergo the boronization process.

In a preferred embodiment, the boronization elements include 5% $B_4C$ as the source, 5% $KBF_4$ as the activator, and 90% SiC as the diluting agent. In alternative embodiments, the boronization elements include, but are not limited to, $B_2D_5$ and $B_2H_6$+a He mixture.

In a preferred embodiment, the heating for the boronization process is at a temperature ranging from 1400° F. to 1900° F. for a time from and/or between two, four, six, and seven hours. Preferably, the heating for the boronization process is less than or equal to seven hours. The appropriate heating time may also be gauged by a depth obtained by the boronization elements. For example, the appropriate heating time may be until the boronization elements obtain a minimum depth of 10 micrometers. Preferably, the heating occurs until the boronization elements obtain a minimum depth of 20-30 micrometers.

Step 408 further includes cooling step 422. Step 422 includes slowly cooling the boronized valve components. For example, the slow cooling process may be achieved with ambient air or other slow circulatory cooling means.

Step 408 further includes measuring step 424. Step 424 includes measuring the surface hardness of the valve component to ensure the wear surface has obtained the appropriate hardness. In a preferred embodiment, a Shimadzu brand HMV Micro Hardness Tester apparatus may be used to measure the hardness of the wear surface and ensure the boriting step was successful. The appropriate hardness for the boronized wear surface is greater than or equal to 1000 HV. Preferably, the appropriate hardness is from 1100 to 1300 HV.

Figure 5:
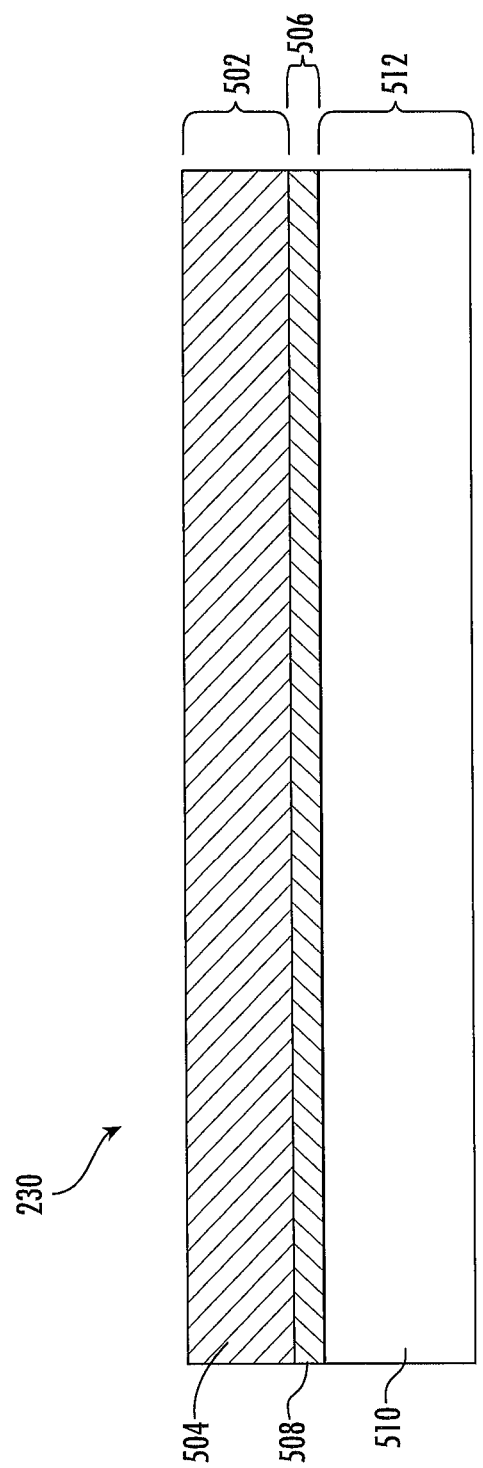
FIG. 5 is a diagram of a cross section of a wear surface.

Referring now also to FIG. 5, in another embodiment, the measuring of surface hardness in step 424 includes measuring a depth the boronization elements, and/or a depth the thermal spray elements, have obtained in the metal alloy due to the surface hardening process. For example, a scanning electron microscope (SEM) may be used to determine depth 502 of a surface hardening element layer 504 and depth 506 of a diffusion layer 508 relative to the unaffected metal alloy layer 510 or relative to the entire thickness of wear surface 230 including depths 502, 506, and 512. In a preferred embodiment the surface hardening element layer 504 includes boronization elements. In other embodiments, the surface hardening element layer 504 includes one or more of carbide, tungsten carbide cobalt (WCCo), chrome carbide nickel chrome ($Cr_3C_2NiCr$), tungsten carbide chrome (WCoCr)), cobalt molybdenum chromium (CoMOCr), iron chrome molybdenum (FeCrMo), nickel aluminum (NiAl), copper (Cu), aluminum oxide ($Al_2O_3$)), or a combination thereof.

Step 410 further includes heating valve components in a vacuum until a desired surface hardness over the remaining surfaces (i.e., other than the wear surfaces) is obtained. For example, step 426 includes heating the choke valve stem, the choke valve seat, the valve body, and other valve components in the vacuum until the entire surface, except for the wear surfaces, obtain a desired hardness value. It is noted that the wear surfaces will have a higher hardness value than the remaining valve component surface.

Step 410 further includes quickly cooling the valve components after the specified heating time has been obtained. For example, a gas fan quenching process may quickly cool the valve components by introducing a quench gas into the vacuum chamber of the container used in step 410. In a preferred embodiment, the quench gas used includes nitrogen, argon, or helium. The pressure at which the quenching occurs is less than or equal to 20 bars.

Step 410 further includes measuring step 430. Step 430 includes measuring the surface hardness of the valve component to ensure the remaining surfaces (surfaces other than the wear surface) have obtained the appropriate hardness. The appropriate hardness for the remaining valve surfaces is approximately 650 to 850 HV. Preferably, the appropriate hardness is from 700 to 810 HV.

Step 412 further includes heating step 432. Step 432 includes heating the valve components at the appropriate tempering temperature until an appropriate surface hardening is obtained. This may include repeating step 432. For example, the tempering process includes heating the choke valve stem, the choke valve seat, the valve body, and other valve components at the appropriate tempering temperature until an appropriate hardness is obtained.

Step 412 further includes cooling step 434. Step 434 includes slowly cooling the valve components to further the tempering process. For example, the slow cooling process may be achieved with ambient air or other slow circulatory cooling means.

Step 412 further includes measuring step 436. Step 436 includes measuring the surface hardness of the tempered valve component to ensure the wear surface has obtained the appropriate hardness. The appropriate hardness for the tempered valve components is approximately 90-105 HV. Preferably, the appropriate hardness is from 95 to 100 HV. It is noted that if appropriate hardness is not obtained, one or more additional tempering steps may occur. Preferably, the tempering process (steps 432, 434, and 436) is repeated at least once.

It is noted that method 400 is a batch process, which is cyclically repeated depending on the desired quantity of valve components. It is further noted that during subsequent batch cycles, such as after initial calibration, one or more process steps may be omitted. For example, measuring step 424, 430, and/or 436 may be omitted assuming process disturbances are minimized and process parameters approximate those used during calibration.

It is noted that using the features of the present application allow operators to obtain high-pressure valves that may be operated with an added degree of safety. The increased surface hardness of the disclosed valve components, without a significant increase in brittleness of the hardened surface, ensures the valve components last longer. Using unitary valve components ensures that even when repairs are necessary, the entire component is replaced instead of the tip or a valve seat, which saves time because replacing a tip or seat of a modular component requires greater time to remove the broken stem tip from the removed valve stem, or the broken valve seat from the removed choke valve seat. Furthermore, old components do not remain in repaired valves. For example, current repair procedures involve replacing a tip of a modular stem or a threaded portion of a modular choke valve seat of a high-pressure valve to obtain different volumetric flow rates or to fix broken valves. However, when these replacements occur, the old, worn remaining body of the choke valve seat or the worn choke valve stem is left in place within the valve, because only the tip or a threaded portion of the seat are replaced. By incorporating the unibody components of the present application in a manifold with two, four, six, or more valves per well, the operator further ensures the integrity of the assembly, and despite repairs or valve failure, flow can be redirected to an operational valve, and continuous operation of the fracking, mineral extraction, or other similar application is maintained.

It is apparent that an invention with significant advantages has been described and illustrated. Although the present application is shown in a limited number of forms, it is not limited to just these forms, but is amenable to various changes and modifications without departing from the spirit thereof.

What is claimed is:

1. A high-pressure valve, comprising:
   a first flow path comprising an inlet;
   a second flow path comprising an outlet;
   a valve chamber disposed between the inlet and the outlet;
   a unibody valve stem having a surface hardened tip disposed at least partially in the valve chamber, the surface hardened tip comprising a boronized tip comprising a single phase layer of $Fe_2B$ having about 8-10 wt % boron; and
   a valve body having a unibody choke seat positioned in the valve body to receive the unibody valve stem and adjustably seal at least one of the inlet and the outlet.

2. The high-pressure valve of claim 1, wherein the boronized tip includes a layer having more $Fe_2B$ than FeB.

3. The high-pressure valve of claim 1, wherein at least the surface hardened tip and the unibody choke seat have wear surfaces comprising one or more substrates that have been boronized at a specific temperature to obtain a layer of boronization elements within the one or more substrates at a minimum depth of ten micrometers.

4. The high-pressure valve of claim 3, wherein the one or more substrates comprises:

ASTM A681 steel or D2 DCF steel.

5. The high-pressure valve of claim 4, wherein the D2 DCF steel comprises:

carbon, manganese, phosphorus, sulphur, silicon, lead, nickel, chromium, molybdenum, copper, vanadium, tungsten, tin, cobalt, aluminum, and titanium.

6. The high-pressure valve of claim 3, wherein the wear surfaces have surface hardness of greater than or equal to 1000 HV; and, wherein the remaining surfaces of unibody valve stem and the unibody choke seat have surface hardness of approximately 650 to 850 HV.

\* \* \* \* \*